Figure 1:
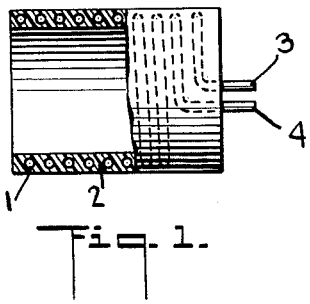

June 18, 1963  J. VON RIEGEN ETAL  3,094,452
METHOD OF MAKING INTERLOCKED WELDED CONNECTIONS
BETWEEN SHAPED THERMOPLASTIC ARTICLES
Filed July 23, 1956

INVENTORS
JOHANNES VON RIEGEN
BY HANS BAUER

*Erich M. H. Radde*

AGENT.

United States Patent Office 3,094,452
Patented June 18, 1963

3,094,452
METHOD OF MAKING INTERLOCKED WELDED CONNECTIONS BETWEEN SHAPED THERMO-PLASTIC ARTICLES
Johannes von Riegen and Hans Bauer, Neu-Ulm (Danube), Germany, assignors to Sued-West-Chemie G.m.b.H., Neu-Ulm (Danube), Germany, a corporation of Germany
Filed July 23, 1956, Ser. No. 599,390
Claims priority, application Germany July 23, 1955
4 Claims. (Cl. 156—275)

The present invention relates to the manufacture of interlocking welded connections between shaped articles, particularly tubes, and fittings or tubular connectors, of thermoplastic synthetic resins. The invention is concerned with the electrical welding process as well as the electrically heatable welding jacket used to connect the shaped articles.

A preferred synthetic resin for the shaped articles and/or the welding sleeve is polyethylene.

The welding sleeve or jacket, which forms the joint between the two shaped articles to be connected, may be connected to one of said articles before welding and with the other one during welding.

It is known to weld together interlocking shaped articles of thermoplastic synthetic resins, for instance, tubes and tube connectors, by heating the interlocking surface of the articles to be connected with an electrically heated conductor placed therebetween.

These known welding processes, however, have a number of disadvantages and they proved to be practically infeasible or of very limited use.

In accordance with the present invention, the disadvantages of the prior art are overcome by first preparing a welding sleeve or jacket consisting of a wire coil connected by or embedded in a thin layer of a thermoplastic synthetic resin. When an electric current is applied to the wire coil, the thin layer of resin and the synthetic resin parts of the shaped articles to be connected, which are adjacent the welding sleeve, will be melted to form a joint.

According to one embodiment of this invention, the welded joint is formed by positioning the welding sleeve between the surfaces to be connected, for instance, the outer surface of a tube and the inner surface of a fitting, and applying a current to the terminals of the wire coil. This causes the thin synthetic resin layer as well as the adjacent synthetic resin walls of the parts to be connected to melt and to form a welded joint comprising the wire coil and the synthetic resin mass surrounding it.

According to another embodiment of the invention, the welding jacket is united with one of the shaped articles before this article is connected to the other one. Preferably, the welding jacket is placed on the core or male die of the mold used for forming the shaped article whose inner surface is to be welded to the other shaped article, for instance, the inner surface of a recessed portion of a tube connector or fitting. When the thermoplastic resin fitting is molded over the welding jacket, which is placed on the core, fitting and jacket are firmly connected. The thermoplastic resin connecting the wire coil may be the same as or different from the synthetic resin of the shaped articles to be connected, and it may partially melt during molding. Even if partial melting occurs during molding, there is no danger of displacement of the wire windings because of the short time involved in injection molding and the lack of pressure which could cause such a displacement.

In accordance with this embodiment of the invention, the welding sleeve is firmly united with one of the shaped articles to be connected. The other shaped article, for instance, the end of a tube or pipe, is then inserted into the welding sleeve and an electrical current is applied to the terminals of the wire coil in the sleeve to heat the same and to melt the adjacent synthetic resin walls to form a welded joint.

Thus, it is a principal feature of the present invention that a separately manufactured welding sleeve is used which sleeve consists of a wire winding and a thin layer of thermoplastic synthetic resin connecting the windings of the wire. The welding sleeve or jacket may be prepared in any suitable manner. For instance, the wire coil may be immersed in a solution or melt or suspension of a thermoplastic synthetic resin. Alternatively, the solution, melt or suspension of the resin may be sprayed onto the wire coil which is preferably positioned on a core. According to a preferred manufacturing procedure, a wire coil surrounded by a synthetic resin film is heated to melt the resin, a thin connecting resin layer being formed between the wire windings upon cooling of the assembly.

The welding process according to the present invention, with its welding sleeve interposed between the surfaces of the shaped articles to be connected, has the advantage of utmost simplicity and usefulness of simple shaped articles, i.e. tubes and fittings.

If standardized parts, for instance, fittings, are used, it is preferred to connect the welding sleeve with the fitting, particularly during its formation.

The layer thickness of the welding sleeve may be uniform throughout its length. However, it may be desirable to provide the sleeve with protruding portions or recesses which have no disturbing influence during welding but serve to lead off any gases or vapors developing during welding.

The thermoplastic synthetic resin of the welding sleeve is preferably a thermoplastic resin with a relatively low melting or, respectively, softening point. It must be capable of combining with the synthetic resin or resins forming the shaped articles to be welded together. It may be the same resin as that of one or both shaped articles to be connected. For instance, polyethylene has been found useful.

The wire coil of the welding sleeve may be heated by connecting it in an electrical circuit or by inserting the joint into an alternate current field. The latter form of welding has the advantage that the welding sleeves may be produced in the form of long tubes and may then be cut into the desired lengths.

The shape of the welding sleeve will depend on the shape of the articles to be connected. Usually, the sleeve will be cylindrical.

Figure 2:
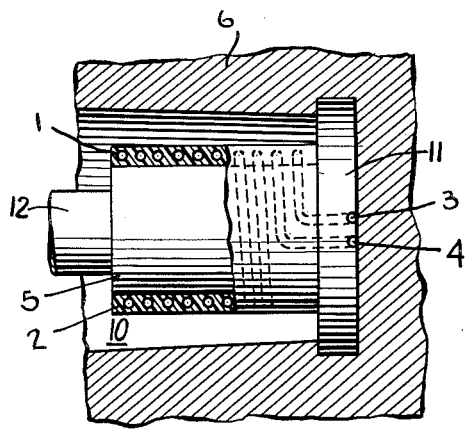

The invention will be more particularly set forth in the following description of certain preferred embodiments illustrated in the accompanying drawing wherein
FIG. 1 is a side view, partly in section, of a welding sleeve or jacket according to the invention;
FIG. 2 is a similar view of the welding sleeve of FIG. 1 arranged on the male die or core of an injection mold for forming a tube or pipe connector; and
FIG. 3 shows the welding of two tube ends by means of a tube connector.

Referring to the drawing, wherein like reference numerals in all figures refer to like parts, the bifilar, equidistant windings of heating coil 1 are embedded in thermoplastic synthetic resin wall 2 to form the welding sleeve. The conductor terminals 3 and 4 of the coil extend beyond the wall of the sleeve.

As shown in FIG. 2, the sleeve may be placed on core 5 of mold 6 which is used to form a tube connector. Terminals 3 and 4 of the heating coil are positioned in suitable bores in an end disc 11 adjacent the molding space 10 which is filled with molding material to form the connector with terminals 3, 4 remaining free of molding material.

Figure 3:
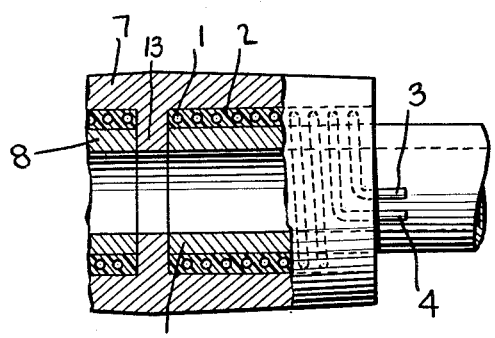

FIG. 3 illustrates a tube connector 7 produced in the mold 5, 6 of FIG. 2. The connector serves to connect tube ends 8 and 9. A centrally positioned core portion 12 of smaller diameter than core 5 defines a molding space for formation of the shoulders 13 of tube connector 7, the tube ends 8 and 9 being inserted into the fitting, as shown in FIG. 3, until they abut shoulders 13.

When electrical current is applied to terminals 3, 4, the wire coil 1 and the surrounding synthetic resin mass is heated and a homogeneous welded joint is formed between tubes 8 and 9. Such joint can be disconnected again by heating the embedded wire coil.

It is, of course, understood that, in place of polyethylene, other thermoplastic resin material may be used for forming the welding sleeve or jacket, such as co-polymers of polyethylene or chlorovinyl polymers or polyamides or polystyrenes or its copolymers.

The heating conductor is preferably composed of wire or ribbon but may also consist of a wire winding of copper or alloys of copper, nickel, iron, and so on.

While preferred embodiments of the invention have been described and illustrated, it will be clearly understood that many modifications and variations may occur to persons skilled in the art, particularly after benefitting from the present teaching, without departing from the spirit and scope of the invention as set forth in the appended claims.

We claim:
1. A process of welding together two interlocking shaped articles of thermoplastic synthetic resin, comprising the steps of forming a welding sleeve comprising essentially a heating conductor having spaced windings and a thin layer of a thermoplastic synthetic resin connecting the heating conductor windings, molding the welding sleeve to one of said shaped articles, interlocking the other one of said shaped articles with said one shaped article so that the welding sleeve lies between the shaped articles, and electrically heating the heating conductor until thermoplastic resin of the welding sleeve and of the other shaped article adjacent thereto melts and welds the interlocking articles together.

2. A process of manufacturing a tubular fitting of thermoplastic synthetic resin, comprising the steps of placing on a cylindrical male die of a mold a welding sleeve comprising essentially a heating conductor having spaced windings and a thin layer of a thermoplastic synthetic resin connecting the heating conductor windings, and molding a tubular connector of thermoplastic synthetic resin around said sleeve in said mold.

3. A process of connecting two tube ends of thermoplastic synthetic resin, comprising the steps of placing a tubular thermoplastic synthetic resin connector over the tube ends, interposing between the tube ends and the connector a welding sleeve consisting of a metal coil and a thin layer of a thermoplastic synthetic resin wherein the coil is embedded, and electrically heating the coil.

4. The process of claim 3, wherein the synthetic resin is polyethylene.

References Cited in the file of this patent
UNITED STATES PATENTS

| | | |
|---|---|---|
| 825,589 | Dixon | July 10, 1906 |
| 1,240,287 | Woodward | Sept. 18, 1917 |
| 1,845,116 | Apple | Feb. 16, 1932 |
| 1,874,723 | Dawson | Aug. 30, 1932 |
| 2,243,506 | Mitchell | May 27, 1941 |
| 2,375,386 | Rick | May 8, 1945 |
| 2,378,801 | Sidell et al. | June 19, 1945 |
| 2,419,848 | Morey | Apr. 29, 1947 |
| 2,552,259 | Collins et al. | May 8, 1951 |
| 2,553,666 | McKechnie | May 22, 1951 |
| 2,548,467 | Crise | Apr. 10, 1951 |
| 2,662,045 | Baggott | Dec. 8, 1953 |
| 2,669,646 | Ford | Feb. 16, 1954 |
| 2,673,374 | Strahm | Mar. 30, 1954 |
| 2,695,853 | Foreit | Nov. 30, 1954 |
| 2,703,437 | Lindblad | Mar. 8, 1955 |
| 2,707,693 | Dorst | May 3, 1955 |
| 2,719,907 | Combs | Oct. 4, 1955 |
| 2,724,869 | Merrill et al. | Nov. 29, 1955 |
| 2,739,829 | Pedlow et al. | Mar. 27, 1956 |
| 2,741,402 | Sayre | Apr. 10, 1956 |
| 2,742,390 | Beck | Apr. 17, 1956 |
| 2,744,655 | Vnuk | May 8, 1956 |
| 2,751,318 | Speekman | June 19, 1956 |
| 2,856,639 | Forrest et al. | Oct. 21, 1958 |

FOREIGN PATENTS

| | | |
|---|---|---|
| 26,644 | Great Britain | A.D. 1898 |
| 78,026 | Netherlands | May 16, 1955 |

OTHER REFERENCES

Modern Plastics, "Resistance-Welded Plastic Pipe Joints," November 1956, pages 150–151; 154–116I.